Sept. 10, 1963 J. M. EITEL 3,103,345
CABLE GUIDING DEVICE
Filed Dec. 8, 1960 3 Sheets-Sheet 1

INVENTOR.
Jay M. Eitel
BY
Attorneys

Sept. 10, 1963  J. M. EITEL  3,103,345
CABLE GUIDING DEVICE
Filed Dec. 8, 1960  3 Sheets-Sheet 2
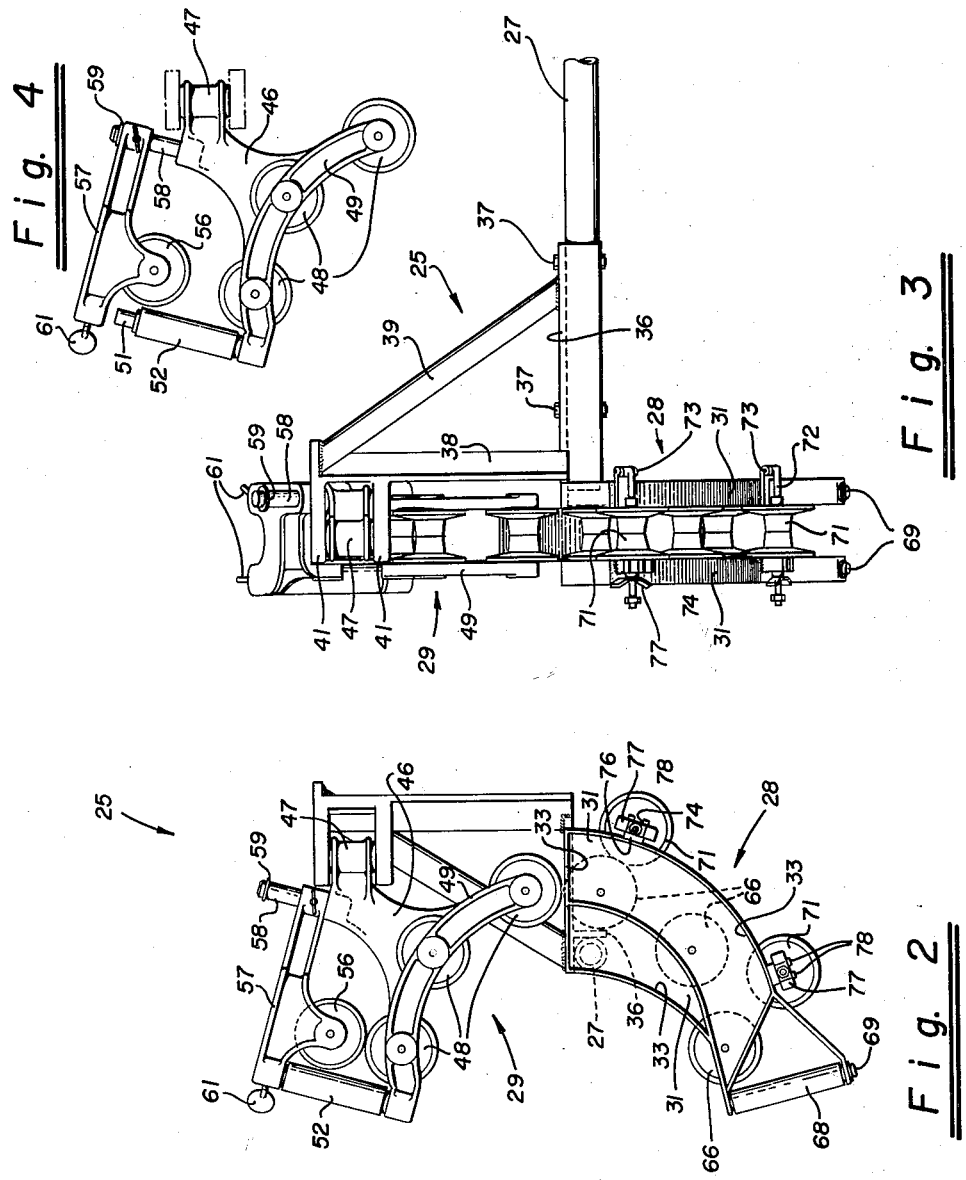
INVENTOR.
Jay M. Eitel
BY
Attorneys Sept. 10, 1963  J. M. EITEL  3,103,345
CABLE GUIDING DEVICE Filed Dec. 8, 1960  3 Sheets-Sheet 3

INVENTOR.
Jay M. Eitel
BY
Attorneys

# United States Patent Office 3,103,345
Patented Sept. 10, 1963

3,103,345
CABLE GUIDING DEVICE
Jay M. Eitel, Los Altos, Calif., assignor to Telsta Corp., San Carlos, Calif., a corporation of California
Filed Dec. 8, 1960, Ser. No. 74,606
5 Claims. (Cl. 254—190)

This invention relates to a cable guiding device and more particularly to a cable guiding device of the type adapted for use in placing aerial cable, messenger, and the like.

Heretofore in the placing of aerial strand or cable, large sheaves, commonly referred to as bull wheels, have been utilized for changing the direction of the strand or cable as it passes forwardly from the drum on which the strand or cable is wrapped. A bend of approximately 180° is placed in the cable or strand to pay the cable or strand off rearwardly through a support provided on a boom carried by the truck. Such a bend is also placed in the cable when cable is placed directly from the bull wheel without passing the cable through a support on the boom. It has been found that the placement of the aerial cable or strand in this manner that many times it is necessary to pay off the cable at a substantial angle sidewise with respect to the bull wheel so that a rather sharp sidewise bend is placed in the cable or strand. Such bends place undue strain on the cable and may actually even permanently damage the cable. There is, therefore, a need for a new and improved cable guiding device or apparatus which will make it possible to eliminate the placing of sharp bends in cable as it is put in place.

In general, it is an object of the present invention to provide a cable guiding device which will make it possible to place aerial strand or cable without placing sharp bends in the strand or cable.

Another object of the invention is to provide a cable guiding device of the above character in which the cable enters the cable guiding device directly without any substantial bend being placed in the cable.

Another object of the invention is to provide a cable guiding device of the above character in which the cable is payed out of the cable guiding device without sharp sidewise bends.

Another object of the invention is to provide a cable guiding device of the above character in which the cable is payed out in a straight line from the cable guiding device.

Another object of the invention is to provide a cable guiding device of the above character which can be utilized on existing cable placing equipment.

Another object of the invention is to provide a cable guiding device of the above character which is adapted for use for various sizes of cable.

Another object of the invention is to provide a cable guiding device of the above character which is easily manufactured and which can be readily installed.

Another object of the invention is to provide a cable guiding device of the above character in which the cable can be inserted in or removed from the cable guiding device without cutting the cable.

Another object of the invention is to provide a cable guiding device of the above character in which the cable cannot accidentally drop out of or away from the cable guiding device.

Additional objects and features of the invention will appear from the following description in which the preferred embodiment is set forth in detail in conjunction with the accompanying drawings.

Referring to the drawings:

FIGURE 2 is a side elevational view of my cable guiding device.

FIGURE 3 is a front elevational view of my cable guiding device.

FIGURE 4 is a side elevational view of a portion of my cable guiding device showing the retaining roller in a raised position so that it can be rotated to an out-of-the-way position to permit removal or placement of the cable in the cable guiding device.

In general, my cable guiding device consists of a frame. Two sets of rollers or pulleys are mounted on the frame. One of the sets is fixed to the frame, whereas the other of the sets is mounted to permit castering of the same about a predetermined axis so that it can follow the cable as it changes directions while it is being payed out from the cable guiding device.

Figure 1:
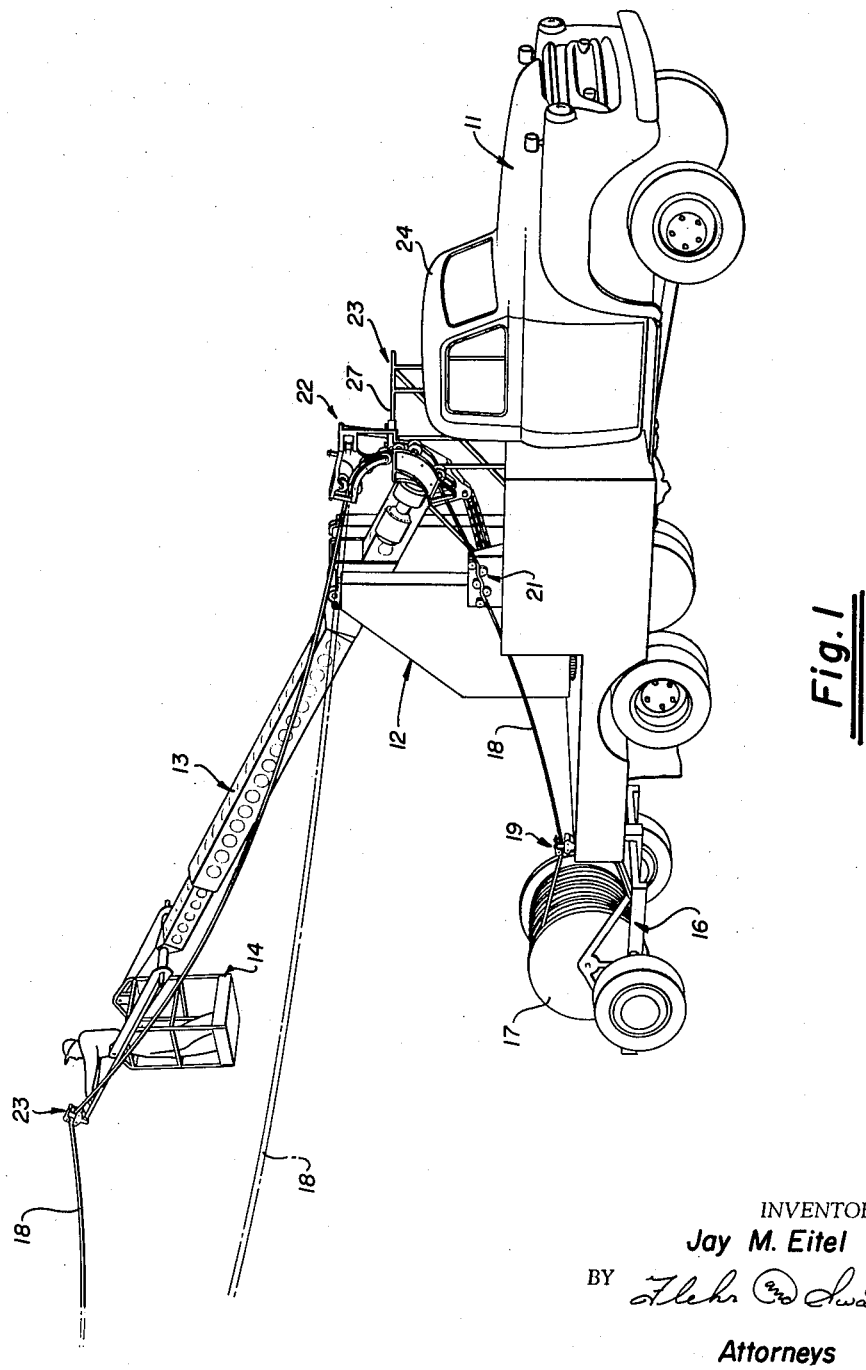
FIGURE 1 is a perspective view of a cable stringing apparatus particularly showing the use of my cable guiding device.

As shown particularly in FIGURE 1, my cable guiding device is particularly adapted for use in cable stringing apparatus of the type disclosed in U.S. Patent No. 2,949,279. This cable placing or stringing apparatus includes a wheeled vehicle 11 having mounted upon it a lifting equipment 12 which includes an extensible boom structure 13 and a workman's basket 14. As described in U.S. Patent Numbers 2,841,404 and 2,896,750, the boom structure is adapted to be swung about a horizontal axis, rotated about a vertical axis, and extended and retracted.

A cable trailer 16 is pulled by the truck 11 and carries a reel 17 upon which is wound a cable 18 guided through a cable guiding device 19 described in U.S. Patent No. 2,949,279 and mounted on the rear of the truck 11. The cable can also be carried on the truck by a spindle mounted on the rear of the body. The cable 18 passes through tensioning means 21 well known to those skilled in the art and then into my cable guiding device 22 mounted on a framework 23 provided on the frame of the truck adjacent the rear of the cab 24 of the truck. The cable is then payed out from my cable guiding device 22 to the cable guiding device 23 provided on the workman's basket 14 and out to the pole line or other support means upon which the cable is being strung or placed. The cable guiding device 23 is identical to the cable guiding device 19. However, it should be pointed out that it is often desirable to pay out the cable directly from the cable guiding device 22 without supporting it at the end of the boom as shown in the dot and dash lines in FIGURE 1.

My cable guiding device 22 as shown particularly in FIGURES 2, 3, 4, 5 and 6 consists of a framework 25 which is mounted on a horizontal pipe 27 which forms a part of the framework 23 mounted behind the cap 24 of the vehicle or truck 11. The framework 25 consists of an upper section 29 and a lower section 28.

The lower section 28 consists of a pair of parallel spaced side plates 31. The side plates 31 are formed with outwardly turned flanges 33 to reinforce the same. The side plates 31 are affixed to a cap member 36 by suitable means such as welding. The cap member 36 is fixed to the pipe 27 by suitable means such as bolts 37.

The upper section 29 of the framework 25 consists of a vertical support member 38 which is affixed to the cap member 36 and is reinforced by an inclined brace 39. A pair of horizontal members 41 are affixed to the support member 38 and carry a hinge pin 42 rotatably mounted in bushings 43. The hinge pin 42 serves as castering means, hinge pin or swivel pin as hereinafter described.

An additional frame member 46 in the form of a casting is provided. It has a cylindrical bearing portion 47 which is journalled on the hinge pin 42 between the spaced horizontal members 41 as shown particularly in FIGURE 5. A plurality of pulleys 48 are mounted between the additional frame member 46 and a frame member 49 so that they form an arc as shown in the drawings. These pulleys 48 make up one set of pulleys and can be termed the castering pulleys. The arc covered by these pulleys may cover any desired included angle as, for example, an angle of approximately 90°.

A pair of pins 51 is mounted on the frame members 46 and 49 and extend in a generally upward direction therefrom. A roller 52 is rotatably mounted on each of the pins 51. These rollers 52 serve to guide the cable as it passes from the cable guiding device as hereinafter described. A retaining pulley or roller 56 is provided adjacent the rollers 52 and generally overlies the pulley 48 closest to the rollers 52. The retaining roller 56 is rotatably carried by a frame member 57 swingably mounted on a pin 58 provided in the frame member 46. Pin 58 is of substantial length so that the frame member 57 can be raised upwardly (as shown in FIGURE 4) away from the frame member 46 to clear the upper ends of the pins 51. The retaining roller 56 can then be swung to an out-of-the-way position to permit placement of the cable in the cable guiding device or to permit removal of the cable from the cable guiding device. A retaining washer 59 is provided on the pin 58 to prevent the frame member 57 from being accidentally pulled off of the pin 58. Thumb screws 61 are provided for securing the frame member 57 to the pins 51.

A plurality of pulleys or rollers 66 are mounted on the lower section 28 of the framework 25. These pulleys 66 form another set of pulleys and are arranged to define a suitable included angle as, for example, 90°. The pulleys 66 are mounted between the side plates 31 as shown in the drawings. Any number of pulleys or rollers can be used in either set of pulleys. It, however, has been found that three pulleys in each set operates very satisfactorily. It will be noted that both sets of pulleys have been arranged so that they lie in substantially a semicircle and, therefore, cover an angle of approximately 180°. As hereinafter described, it is readily apparent that if desired, a greater or lesser angle can be used.

A pair of side guide rollers 68 are rotatably mounted on pins 69 supported by the plates 31 and are adapted to guide the cable as hereinafter described. A pair of retaining rollers 71 are mounted on the bottom portions of the side plates 31. The rollers 71 are carried by axle assemblies 72 which are hinged to one of the side plates 31 at 73. The axle assemblies are adapted to extend into slots 74 provided in angle members 76 secured to the other of the side members 31. Fingers 77 slidably carried on the axle assemblies 72 and yieldably urged toward the pulleys 71 are adapted to engage outwardly turned portions provided on the brackets 76. By pulling outwardly on the fingers 77, the fingers 77 can be moved out of engagement with the ears 78 to permit the retaining pulleys or rollers 71 to be moved to an out-of-the-way position to permit the cable to be placed in the cable guiding device or to permit it to be removed from the cable guiding device.

Figures 5, 6:
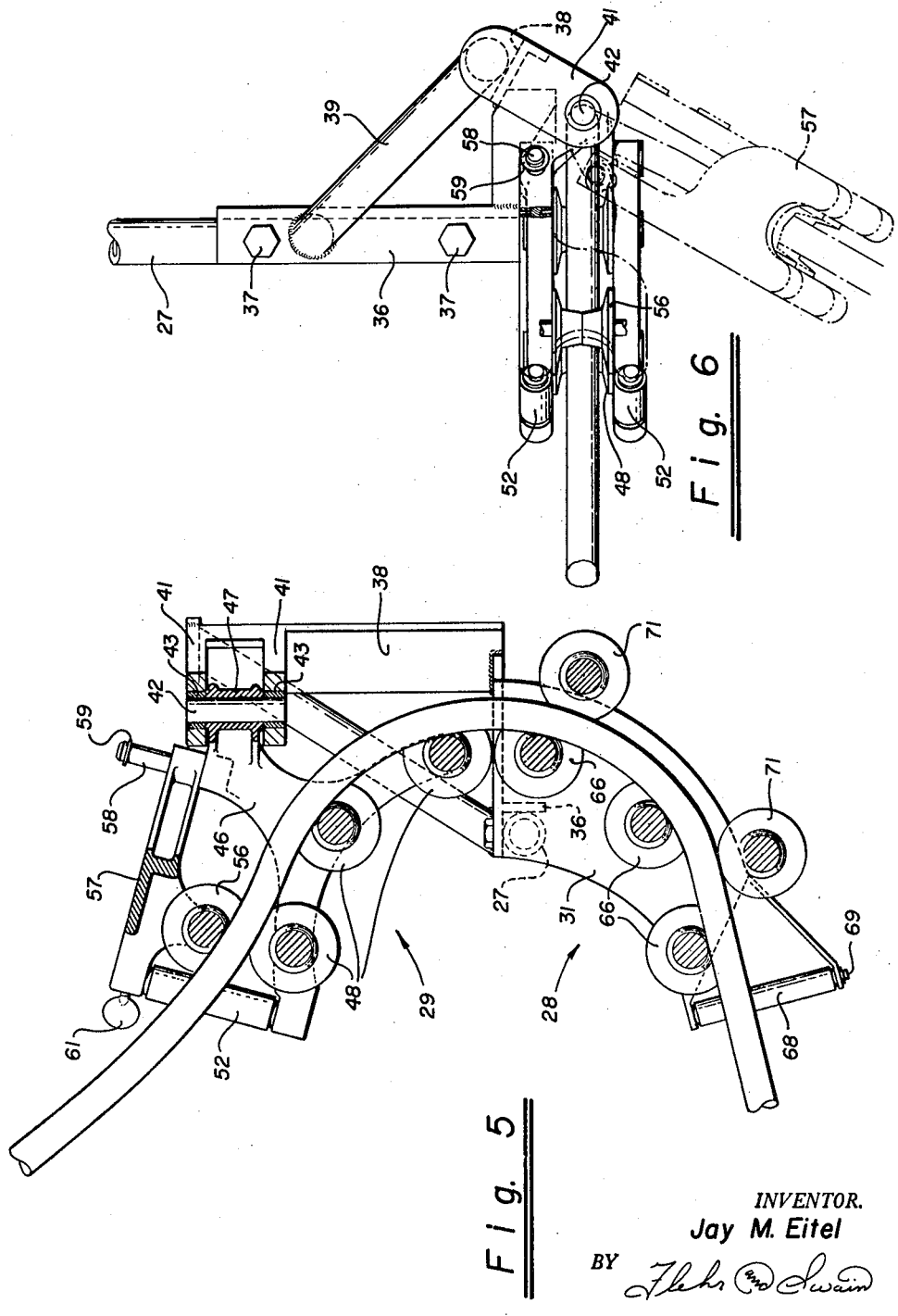
FIGURE 5 is a cross-sectional view showing the path of travel of the cable through my cable guiding device.
FIGURE 6 is a plan view showing the operation of my cable guiding device in placing cable.

Operation and use of my cable guiding device may now be briefly described as follows. Let it be assumed that it is desired to place the cable 18 in the cable guiding device. The cable is first payed from the reel 17 past the cable guiding device 19, through the tensioning device 21, and then into the cable guiding device 22. The lower retaining rollers 71 are first moved to an out-of-the-way position and then the cable is placed between the two vertical rollers 68 and beneath the rollers 66 between the two side plates 31, and then over the rollers 48 as shown in FIGURE 5. Before placing the cable on the rollers or pulleys 48, the upper retaining roller 56 is moved to an out-of-the-way position by first raising it as shown in FIGURE 4, and then swinging it to the right or left.

After the cable is placed over the rollers 48, the rollers 71 are moved into an engaging position in which they underlie the cable and the upper retaining roller 56 is moved into a position so it overlies the cable. The cable is then extended up along the boom structure 13 and through the cable guiding device 23 carried by the workman's basket. However, as pointed out above it is not necessary that the cable be supported at the end of the boom but if desired it can be payed out directly from my cable guiding device 22. The cable can then be secured and put in place in a manner well known to those skilled in the art.

As the vehicle advances, the cable is payed from the reel and passes into my cable guiding device 22. It will be noted that the cable enters my cable guiding device in a forward direction substantially in line with the direction in which it is payed from the reel 17. The cable passes between the guide rollers 68 which serve to limit sidewise movement of the cable. Thereafter, the cable is guided in an upward direction through an angle of approximately 90° by the three lower rollers 66. The lower retaining rollers 71 prevent the cable from dropping out of my cable guiding device in the event slack should occur in the cable as, for example, when the truck backs up.

The cable passes smoothly over the lower rollers 66 as shown particularly in FIGURE 5. Thereafter, it passes onto the upper set or additional set of rollers 48 which guide the cable rearwardly and through a pair of substantially vertical guide rollers 52. The retaining roller 56 prevents the cable from being raised out of my cable guiding device in the event that the cable is payed out at such an angle that its normal line of travel is above the upper ends of the vertical guide rollers 52. From the above, it will be noted that my cable guiding device changes the direction of travel of the cable in a vertical plane by approximately 180°. That is, it changes it from a forward direction to a rearward direction so that it can be payed out along the boom and into the cable guiding device 23. This function of my cable guiding device is substantially similar to the function which is performed by the conventional bull wheel heretofore utilized.

My cable guiding device, however, performs an additional function in that it permits the cable to be payed out from either side of the vehicle without placing very large sidewise bends in the cable and, therefore, helps to prevent cable damage. As is well known to those skilled in the art, the cable placing apparatus shown in FIGURE 1 normally travels in a position which is removed at some distance from the position in which the cable is actually being placed. For that reason, the boom structure 13 is normally rotated so that it is at an angle with respect to the longitudinal axis of the vehicle. When this is true the cable must be payed out at an angle with respect to the longitudinal axis of the truck. When this occurs with my cable guiding device, the upper set or pulleys 48 follows the cable as shown in dotted lines in FIGURE 6. The upper set or additional set of pulleys 48 together with the frame members 46 and 49, therefore, caster or swivel about the hinge pin or swivel pin 42. The axis of castering or swiveling for the pulleys 48 is such that the center line of the hinge pin 42 passes through or substantially through the center line of the cable as it passes over the uppermost rollers 66. This permits the upper set of rollers to follow the cable at all times and still permits the lowermost roller of the rollers 48 to rotate about the center line of the cable and to follow and guide the cable at all times as it passes from the uppermost roller of the rollers 66.

It will be seen from the foregoing that the arrangement of the upper set of pulleys 48 is such that these pulleys always follow the cable so that the cable is payed out in a substantially straight line from the same. The castering assembly consisting of the pulleys 48 serves to eliminate any sharp bends in the cable at the point the cable leaves my cable guiding device.

At the point where the cable makes a transition from the lower rollers 66 to the upper rollers 48 a rolling action of the cable without twisting occurs to accommodate the change in direction of travel of the cable. The cable first rolls in one direction and then in the opposite direction so no twist is placed in the cable.

It should be realized that with cables of different diameters, the exact axis for the hinge pin 42 would change because the axis of the cable shifts. The axis of the pin 42 if desired could be made so that it could be shifted so that it always will be in alignment with the axis of the cable as it passes over the upper roller of the rollers 66 and the lower roller of the rollers 48.

It is apparent from the foregoing that I have provided a new and improved cable guiding device which makes it possible to place cable without placing sharp bends or twists in the cable which might seriously damage the cable. The construction of the cable guiding device is such that it can be mounted on conventional cable placing apparatus without substantial modification to the apparatus. Its construction is also such that it can be readily manufactured and assembled.

I claim:

1. In a device for guiding cable, a framework, a plurality of cable guiding pulleys rotatably mounted in the framework to provide a substantially arcuate path for the travel of a cable in the framework, a plurality of additional cable guiding pulleys rotatably mounted in said framework to provide an additional arcuate path for the travel of the cable in said framework, said additional arcuate path being positioned relative to the first named arcuate path so that the cable passes directly from the first named arcuate path to the additional arcuate path, and means for mounting said additional pulleys to permit castering of said additional pulleys about a predetermined axis relative to other of said pulleys, the castering of said additional pulleys permitting said additional pulleys to operate as a unitary assembly to follow the cable as it changes direction in entering or leaving the device.

2. A cable guiding device as in claim 1 wherein said predetermined axis is substantially in line with the axis of the cable as it passes from the first named arcuate path to the additional arcuate path.

3. In a device for guiding a flexible elongate cable, a framework, a plurality of pulleys mounted on said framework for rotation on parallel axes to provide a substantially arcuate path for guiding the cable, a pair of spaced guide rollers mounted on said framework for rotation on axes substantially perpendicular to the axes of rotation of said pulleys, said guide rollers being disposed at one extremity of the arcuate path and serving to limit sidewise movement of the cable relative to the arcuate path, an additional framework, a plurality of additional pulleys mounted on said additional framework for rotation on parallel axes to provide an additional substantially arcuate path for guiding the cable, an additional pair of spaced guide rollers mounted on said additional framework for rotation on axes substantially perpendicular to the axes of rotation of said additional pulleys, said additional guide rollers being disposed at one extremity of the additional arcuate path and serving to limit sidewise movement of the cable relative to the additional arcuate path, and means for mounting the additional framework on the first named framework for swinging movement with respect to each other and so that the cable can pass from the other extremity of one arcuate path to the other extremity of the other arcuate path, the swinging movement of the first named and additional frameworks with respect to each being on an axis substantially coincident with the centerline of the cable as it passes from one arcuate path to the other.

4. A device as in claim 3 together with a retaining pulley mounted on said first named framework in relatively close proximity to at least one of the first named pulleys, said first named path and said first named rollers, said retaining pulley being movable between cable retaining and cable releasing positions, said retaining pulley in a cable retaining position being rotatable on an axis parallel to the axes of rotation of the first named pulleys, and an additional retaining pulley mounted on said additional framework in relatively close proximity to at least one of the additional pulleys, said additional arcuate path and said additional rollers, said additional retaining pulley being movable between cable retaining and cable releasing positions, said additional retaining pulley in a cable retaining position being rotatable on an axis parallel to the axes of rotation of the additional pulleys.

5. In a device for guiding a flexible elongate cable, a framework, a plurality of pulleys mounted on said framework for rotation on parallel axes to provide a substantially arcuate path for guiding the cable, a retaining pulley mounted on said framework in relatively close proximate to at least one of the first named pulleys and the arcuate path, said retaining pulley being movable between cable retaining and cable releasing positions, said retaining pulley in a cable retaining position being rotatable on an axis parallel to the axes of rotation of the first named pulleys, an additional framework, a plurality of additional pulleys mounted on said additional framework for rotation on parallel axes to provide an additional substantially arcuate path for guiding the cable, an additional retaining pulley mounted on said framework in relatively close proximity to at least one of the additional pulleys and the additional arcuate path, said additional retaining pulley being movable between cable retaining and cable releasing positions, said additional retaining pulley in a cable retaining position being rotatable on an axis parallel to the axes of rotation of the additional pulleys, and means for mounting the additional framework on the first named framework for swinging movement with respect to each other and so that the cable can pass from one arcuate path to the other arcuate path, the swinging movement of the first named and additional frameworks with respect to each other being on an axis substantially coincident with the centerline of the cable as it passes from one arcuate path to the other.

References Cited in the file of this patent

UNITED STATES PATENTS

| | | |
|---|---|---|
| 181,985 | Richardson | Sept. 5, 1876 |
| 1,657,187 | Whittlesey | Jan. 24, 1928 |
| 1,865,113 | Kiesel | June 28, 1932 |
| 2,272,917 | Lawlor | Feb. 10, 1942 |
| 2,343,894 | Fisher | Mar. 14, 1944 |
| 2,344,417 | Schmidt et al. | Mar. 14, 1944 |
| 2,558,254 | Johnson | June 22, 1951 |
| 2,731,233 | Lindsay | Jan. 17, 1956 |
| 2,833,423 | Tucker | May 6, 1958 |
| 2,926,001 | Mack et al. | Feb. 23, 1960 |
| 2,929,516 | Fladmark | Mar. 22, 1960 |